US008795010B1

(12) United States Patent
Wiatrowski

(10) Patent No.: US 8,795,010 B1
(45) Date of Patent: Aug. 5, 2014

(54) DRIVE UNIT MOUNT FOR A MARINE OUTBOARD ENGINE

(75) Inventor: Darrell Wiatrowski, Libertyville, IL (US)

(73) Assignee: BRP US Inc., Sturtevant, WI (US)

( * ) Notice: Subject to any disclaimer, the term of this patent is extended or adjusted under 35 U.S.C. 154(b) by 205 days.

(21) Appl. No.: 13/307,988

(22) Filed: Nov. 30, 2011

(51) Int. Cl.
*B63H 21/30* (2006.01)
*F16F 15/04* (2006.01)

(52) U.S. Cl.
USPC .......................................... 440/52; 248/640

(58) Field of Classification Search
CPC ........ B63H 21/30; B63H 20/24; B63H 20/36; B63H 21/305
USPC ........ 440/52, 53; 248/640; 267/140.11, 140.5
See application file for complete search history.

(56) References Cited

U.S. PATENT DOCUMENTS

| | | | |
|---|---|---|---|
| 2,549,486 A | 4/1951 | Kiekhaefer | |
| 2,723,639 A | 11/1955 | Hinrichs et al. | |
| 2,740,368 A | 4/1956 | Irgens et al. | |
| 3,013,518 A | 12/1961 | Smith | |
| 3,062,173 A | 11/1962 | Kiekhaefer | |
| 3,599,594 A | 8/1971 | Taipale | |
| 3,613,631 A | 10/1971 | Wick et al. | |
| 3,623,446 A | 11/1971 | Shimanckas | |
| 3,774,571 A | 11/1973 | Shimanckas | |
| 3,934,537 A * | 1/1976 | Hall | 440/52 |
| 4,303,401 A * | 12/1981 | Sanmi et al. | 440/88 R |
| 4,521,201 A | 6/1985 | Watanabe | |
| 4,557,695 A | 12/1985 | Neisen | |
| 4,622,015 A | 11/1986 | Sumigawa | |
| 4,689,024 A | 8/1987 | Ferguson | |
| 4,701,141 A | 10/1987 | Sumigawa | |
| 4,826,460 A | 5/1989 | Zuckerman | |
| 4,979,918 A | 12/1990 | Breckenfeld et al. | |
| 5,105,924 A | 4/1992 | Carlson | |
| 5,180,319 A * | 1/1993 | Shiomi et al. | 440/52 |

(Continued)

FOREIGN PATENT DOCUMENTS

| | | |
|---|---|---|
| JP | 62279190 A2 | 4/1987 |
| JP | 2000108994 A | 4/2000 |

OTHER PUBLICATIONS

Shiomi et al.: Reducing Vibration of a 2-Cylinder Outboard Motor by the Pendulum Motion Mount Method, SAE Technical Paper Series 2001-01-1870/290, 2001.

(Continued)

*Primary Examiner* — Lars A Olson
*Assistant Examiner* — Andrew Polay
(74) *Attorney, Agent, or Firm* — BCF LLP

(57) ABSTRACT

A drive unit mount has a tapering central rigid member, top and bottom rigid members, and top and bottom resilient members. The top and bottom surfaces of the central rigid member, the bottom surface of the top rigid member and the top surface of the bottom rigid member have winding lateral cross-sections. A space defined between the bottom surface of the top rigid member and a top surface of the bottom rigid member tapers at least in part from the fronts of the top and bottom rigid members to the backs of the top and bottom rigid members. The top and bottom resilient members are disposed between and are in contact with the central rigid member and a corresponding one of the top and bottom rigid members. A drive unit mount having a rear resilient member and a marine outboard engine having a drive unit mount are also disclosed.

16 Claims, 15 Drawing Sheets

(56) References Cited

U.S. PATENT DOCUMENTS

| | | |
|---|---|---|
| 5,190,488 A | 3/1993 | Fujimoto |
| 5,194,025 A | 3/1993 | Blanchard et al. |
| 6,146,221 A | 11/2000 | Natsume |
| 6,174,211 B1 | 1/2001 | Nakamura |
| 6,200,175 B1 | 3/2001 | Natsume |
| 6,341,992 B1 | 1/2002 | Eglinsdoerfer et al. |
| 6,354,893 B1 | 3/2002 | Sato |
| 6,592,414 B2 | 7/2003 | Mineno et al. |
| 6,648,703 B2 | 11/2003 | McChesney et al. |
| 6,659,817 B1 | 12/2003 | Anderson et al. |
| 7,168,383 B2 | 1/2007 | Saito |
| 7,758,393 B2 | 7/2010 | Lucier et al. |

OTHER PUBLICATIONS

Shiomi et al., "Isolating Vibration Through Use of Traveling Center of Engine Oscillation", SAE Paper No. 911293, pp. 573-582, Japan.

English Abstract of Japanese Application No. JP62279190; Dec. 5, 2011.

English Abstract of Japanese Application No. JP2000108994; Dec. 5, 2011.

\* cited by examiner

DRIVE UNIT MOUNT FOR A MARINE OUTBOARD ENGINE

FIELD OF THE INVENTION

The present invention relates to a drive unit mount. More specifically, the present invention relates to a drive unit mount to be used in a marine outboard engine.

BACKGROUND

As is well known, internal combustion engines generate vibrations during operation. These vibrations get transmitted to the vehicle or device to which they are mounted. Mounts are typically mounted between the engine and the vehicle or device to actively or passively reduce the transmission of the vibrations thereto. The effectiveness of the mounts is related to both their type and their location amongst other factors. Mounts are also typically more effective over certain ranges of speed of the engine. Typically, in marine outboard engines, a soft mount is desired for operation at idle and low engine speed, while a stiffer mount is desired for operation at higher engine speeds.

FIG. 2 illustrates a side view of a drive unit mount 10 used in marine outboard engines which at least partially addresses the above issue. The drive unit mount 10 includes a central rigid member 12, a top rigid member 14, a bottom rigid member 16, a top resilient member 18 and a bottom resilient member 20. As can be seen, the central rigid member 12 is wedge-shaped. The top and bottom rigid members 14, 16 are also wedge-shaped and arranged, as shown in FIG. 2, above and below the central rigid member 12. The top resilient member 18 is disposed in the angled space defined between the flat top surface of the central rigid member 12 and the flat bottom surface of the top rigid member 14. The bottom resilient member 20 is disposed in the angled space defined between the flat bottom surface of the central rigid member 12 and the flat top surface of the bottom rigid member 16.

A front 22 of the central rigid member 12 is connected to a bracket (not shown) used to connect a drive unit (not shown) of the marine outboard engine to the stern of a boat. The bracket is disposed between the stern of the boat and the drive unit. The drive unit is connected to the drive unit mount 10 by the top and bottom rigid members 14, 16. When the engine of the drive unit is in operation and a transmission thereof is in a position to engage a propeller in order to propel the marine outboard engine and therefore the boat forwardly, the drive unit applies a force, indicated by arrows 24, on the drive unit mount 10. The magnitude of this force is a function of the engine speed. This force causes the top and bottom rigid members 14, 16 to move slightly forwardly relative to the central rigid member 12. As a result, the top resilient member 18 is compressed between the top rigid member 14 and the central rigid member 12 and the bottom resilient member 20 is compressed between the bottom rigid member 16 and the central rigid member 12. As the force being applied increases, the more the resilient members 18, 20 are compressed. As the degree of compression of the resilient members 18, 20 increases, the stiffer the resilient members 18, 20 become. Therefore, the drive unit mount 10 has a variable stiffness depending on engine speed.

Although the above drive unit mount 10 addresses the issue of providing variable stiffness, its stiffness only varies as a result of the force indicated by the arrows 24 which is generated by the propeller. The drive mount unit 10 has a constant and low stiffness laterally. As such, the stiffness of the drive mount 10 is not ideally suited for absorbing vibrations when high lateral forces are applied to the drive mount 10 when the marine outboard engine is turned to steer the boat.

Thus, although the drive unit mount illustrated in FIG. 2 provides adequate vibration damping under many operating conditions, there is a need for a drive unit mount for a marine outboard engine that also absorbs vibrations over a range of lateral forces applied to the drive unit, as a result of steering of the drive unit for example.

SUMMARY

It is an object of the present invention to ameliorate at least some of the inconveniences present in the prior art.

In one aspect, the present provides a drive unit mount having a central rigid member, a top rigid member, a bottom rigid member, a top resilient member and a bottom resilient member. The central rigid member has a front, a back, a top surface and a bottom surface. The central rigid member tapers at least in part from the front to the back. The top surface of the central rigid member has one of a convex and a concave lateral cross-section. The bottom surface of the central rigid member has one of a convex and a concave lateral cross-section. The top rigid member has a front, a back and a bottom surface. The top rigid member is disposed above the central rigid member. The bottom surface of the top rigid member has a concave lateral cross-section when the top surface of the central rigid member has a convex lateral cross-section and has a convex lateral cross-section when the top surface of the central rigid member has a concave lateral cross-section. The bottom rigid member has a front, a back and a top surface. The bottom rigid member is disposed below the central rigid member. The top surface of the bottom rigid member has a concave lateral cross-section when the bottom surface of the central rigid member has a convex lateral cross-section and has a convex lateral cross-section when the bottom surface of the central rigid member has a concave lateral cross-section. A space defined between the bottom surface of the top rigid member and a top surface of the bottom rigid member tapers at least in part from the fronts of the top and bottom rigid members to the backs of the top and bottom rigid members. At least a portion of the central rigid member is received in the space. The top resilient member is disposed between and is in contact with the bottom surface of the top rigid member and the top surface of the central rigid member. The bottom resilient member is disposed between and is in contact with the top surface of the bottom rigid member and the bottom surface of the central rigid member.

In a further aspect, the top and bottom surfaces of the central rigid member have convex lateral cross-sections, and the bottom surface of the top rigid member and the top surface of the bottom rigid member have concave lateral cross-sections.

In an additional aspect, the convex lateral cross-sections of the top and bottom surfaces of the central rigid member each include a generally V-shaped protrusion. The concave lateral cross-sections of the bottom surface of the top rigid member and the top surface of the bottom rigid member each include a generally V-shaped recess. The top and bottom resilient members have generally chevron-shaped lateral cross-sections.

In a further aspect, the central rigid member is generally shaped as a right hexagonal pyramidal frustum. The front and back of the central rigid member are generally hexagonal in shape.

In an additional aspect, the lateral cross-section of the top surface of the central rigid member is complementary in shape to the lateral cross-section of the bottom surface of the top rigid member. The lateral cross-section of the bottom surface of the central rigid member is complementary in shape to the lateral cross-section of the top surface of the bottom rigid member.

In a further aspect, a rear resilient member is disposed at least in part rearwardly of and is in contact with the back of the central rigid member.

In an additional aspect, the rear resilient member is integrally formed with the top and bottom resilient members.

In a further aspect, a stopper extends from at least one lateral side of the central rigid member.

In an additional aspect, a coating of resilient material coats at least in part the central rigid member, the top rigid member and the bottom rigid member. The coating, the top resilient member and the bottom resilient member are made of a same resilient material and are integrally formed.

In an additional aspect, the present provides a marine outboard engine for a watercraft having a stern bracket for mounting the marine outboard engine to the watercraft, a swivel bracket pivotally connected to the stern bracket about a generally horizontal tilt/trim axis, a drive unit pivotally connected to the swivel bracket about a steering axis, the steering axis being generally perpendicular to the tilt/trim axis, a first drive unit mount connecting a first side of the drive unit to the swivel bracket, and a second drive unit mount connecting a second side of the drive unit to the swivel bracket. The second side of the swivel bracket is opposite to the first side of the swivel bracket. Each of the first and a second drive unit mounts has a central rigid member, a top rigid member, a bottom rigid member, a top resilient member and a bottom resilient member. The central rigid member has a front, a back, a top surface and a bottom surface The central rigid member tapers at least in part from the front to back. The top surface of the central rigid member has one of a convex and a concave lateral cross-section. The bottom surface of the central rigid member has one of a convex and a concave lateral cross-section. The central rigid member is connected to the swivel bracket. The top rigid member has a front, a back and a bottom surface. The top rigid member is disposed above the central rigid member. The bottom surface of the top rigid member has a concave lateral cross-section when the top surface of the central rigid member has a convex lateral cross-section and has a convex lateral cross-section when the top surface of the central rigid member has a concave lateral cross-section. The top rigid member is connected to the drive unit. The bottom rigid member has a front, a back and a top surface. The bottom rigid member is disposed below the central rigid member. The top surface of the bottom rigid member has a concave lateral cross-section when the bottom surface of the central rigid member has a convex lateral cross-section and has a convex lateral cross-section when the bottom surface of the central rigid member has a concave lateral cross-section. A space defined between the bottom surface of the top rigid member and a top surface of the bottom rigid member tapers at least in part from the fronts of the top and bottom rigid members to the backs of the top and bottom rigid members. At least a portion of the central rigid member is received in the space. The bottom rigid member is connected to the drive unit. The top resilient member is disposed between and is in contact with the bottom surface of the top rigid member and the top surface of the central rigid member. The bottom resilient member is disposed between and is in contact with the top surface of the bottom rigid member and the bottom surface of the central rigid member.

In a further aspect, the drive unit has a cowling, an engine disposed in the cowling, a driveshaft disposed in the cowling, the driveshaft having a first end and a second end, the first end of the driveshaft being operatively connected to the engine, a midsection having a first end and a second end, the first end of the midsection being connected to the engine, a gear case operatively connected to the second end of the midsection, a transmission disposed in the gear case, the transmission being operatively connected to the second end of the driveshaft, a propeller shaft disposed at least in part in the gear case at an angle to the driveshaft, the propeller shaft being operatively connected to the transmission, and a bladed rotor connected to the propeller shaft. The first and second drive unit mounts are connected to one of the engine, the cowling, the midsection and the gear case.

In an additional aspect, the one of the engine, the cowling, the midsection and the gear case is the midsection.

In a further aspect, for each of the first and second drive unit mounts, the top and bottom rigid members are connected to the drive unit by being press-fit in the drive unit.

In an additional aspect, for each of the first and second drive unit mounts: the top and bottom surfaces of the central rigid member have convex lateral cross-sections, and the bottom surface of the top rigid member and the top surface of the bottom rigid member have concave lateral cross-sections.

In a further aspect, each of the first and second drive unit mounts also has a stopper extending from at least one lateral side of the central rigid member. The stopper is received in a corresponding slot formed in the drive unit.

In an additional aspect, the drive unit has a first cover covering at least in part the first drive unit mount and a second cover covering at least in part the second drive unit mount. The slot receiving the stopper of the first drive unit mount is formed in the first cover. The slot receiving the stopper of the second drive unit mount is formed in the second cover.

In another aspect, the present provides a drive unit mount having a central rigid member, a top rigid member, a bottom rigid member, a top resilient member, a bottom resilient member and a rear resilient member. The central rigid member has a front, a back, a top surface and a bottom surface. The central rigid member tapers at least in part from the front to the back. The top rigid member has a front, a back and a bottom surface. The top rigid member is disposed above the central rigid member. The bottom rigid member has a front, a back and a top surface. The bottom rigid member is disposed below the central rigid member. A space defined between the bottom surface of the top rigid member and a top surface of the bottom rigid member tapers at least in part from the fronts of the top and bottom rigid members to the backs of the top and bottom rigid members. At least a portion of the central rigid member is received in the space. The top resilient member is disposed between and is in contact with the bottom surface of the top rigid member and the top surface of the central rigid member. The bottom resilient member is disposed between and is in contact with the top surface of the bottom rigid member and the bottom surface of the central rigid member. The rear resilient member is disposed at least in part rearwardly of the central rigid member.

In a further aspect, the rear resilient member is fixed to the central rigid member.

In an additional aspect, the rear resilient member is integrally formed with the top and bottom resilient members.

In a further aspect, the top, bottom and rear resilient member together form a generally U-shape.

In yet another aspect, the present provides a marine outboard engine for a watercraft having a stern bracket for mounting the marine outboard engine to the watercraft, a swivel bracket pivotally connected to the stern bracket about a generally horizontal tilt/trim axis, a drive unit pivotally connected to the swivel bracket about a steering axis, the steering axis being generally perpendicular to the tilt/trim axis, a first drive unit mount connecting a first side of the drive unit to the swivel bracket, and a second drive unit mount connecting a second side of the drive unit to the swivel bracket, the second side of the swivel bracket being opposite to the first side of the swivel bracket. Each of the first and a second drive unit mounts has a central rigid member, a top rigid member, a bottom rigid member, a top resilient member, a bottom resilient member and a rear resilient member. The central rigid member has a front, a back, a top surface and a bottom surface. The central rigid member tapers at least in part from the front to the back. The central rigid member is connected to the swivel bracket. The top rigid member has a front, a back and a bottom surface. The top rigid member is disposed above the central rigid member. The top rigid member is connected to the drive unit. The bottom rigid member has a front, a back and a top surface. The bottom rigid member is disposed below the central rigid member. The bottom rigid member is connected to the drive unit. A space defined between the bottom surface of the top rigid member and a top surface of the bottom rigid member tapers at least in part from the fronts of the top and bottom rigid members to the backs of the top and bottom rigid members. At least a portion of the central rigid member is received in the space. The top resilient member is disposed between and is in contact with the bottom surface of the top rigid member and the top surface of the central rigid member. The bottom resilient member is disposed between and is in contact with the top surface of the bottom rigid member and the bottom surface of the central rigid member. The rear resilient member is disposed at least in part rearwardly of the back of the central rigid member.

In an additional aspect, the drive unit has a first wall disposed rearwardly of the rear resilient member of the first drive unit mount, and a second wall disposed rearwardly of the rear resilient member of the second drive unit mount. When the drive unit generates thrust above a predetermined thrust, the first wall compresses the rear resilient member of the first drive unit mount and the second wall compresses the rear resilient member of the second drive unit mount.

In a further aspect, the drive unit has a cowling, an engine disposed in the cowling, a driveshaft disposed in the cowling, the driveshaft having a first end and a second end, the first end of the driveshaft being operatively connected to the engine, a midsection having a first end and a second end, the first end of the midsection being connected to the engine, a gear case operatively connected to the second end of the midsection, a transmission disposed in the gear case, the transmission being operatively connected to the second end of the driveshaft, a propeller shaft disposed at least in part in the gear case at an angle to the driveshaft, the propeller shaft being operatively connected to the transmission, and a bladed rotor connected to the propeller shaft. The first and second drive unit mounts are connected to one of the engine, the cowling, the midsection and the gear case.

In an additional aspect, the one of the engine, the cowling, the midsection and the gear case is the midsection.

In a further aspect, for each of the first and second drive unit mounts, the top and bottom rigid members are connected to the drive unit by being press-fit in the drive unit.

In an additional aspect, each of the first and second drive unit mounts also has a stopper extending from at least one lateral side of the central rigid member. The stopper is received in a corresponding slot formed in the drive unit.

In a further aspect, the drive unit has a first cover covering at least in part the first drive unit mount and a second cover covering at least in part the second drive unit mount. The slot receiving the stopper of the first drive unit mount is formed in the first cover. The slot receiving the stopper of the second drive unit mount is formed in the second cover.

In an additional aspect, for each of the first and second drive unit mounts, the rear resilient member is integrally formed with the top and bottom resilient members.

In a further aspect, for each of the first and second drive unit mounts, the top, bottom and rear resilient member together form a generally U-shape.

In an additional aspect, the rear resilient member is fixed to the central rigid member For purposes of the present application, terms related to spatial orientation when referring to a marine outboard engine and components in relation to the marine outboard engine, such as "forwardly", "rearwardly", "left", "right", "above" and "below", are as they would be understood by a driver of a boat to which the marine outboard engine is connected, with the marine outboard engine connected to the stern of the boat, in a straight ahead orientation (i.e. not steered left or right), and in an upright position (i.e. not tilted and not trimmed). When referring to a drive unit mount alone, terms related to spatial orientation should be taken with respect to the drive unit mount itself. Also for purposes of the present application, the term "right" used as a qualifier for a pyramid, such as in "right pyramid" or "right pyramidal frustum", means that the end portion (i.e. an apex in the case of a pyramid and a surface in the case of a pyramidal frustum) of the pyramid is centrally located relative to a base of the pyramid. The explanations provided above regarding the above terms take precedence over explanations of these terms that may be found in any one of the documents incorporated herein by reference.

Embodiments of the present invention each have at least one of the above-mentioned object and/or aspects, but do not necessarily have all of them. It should be understood that some aspects of the present invention that have resulted from attempting to attain the above-mentioned object may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

Figure 1:
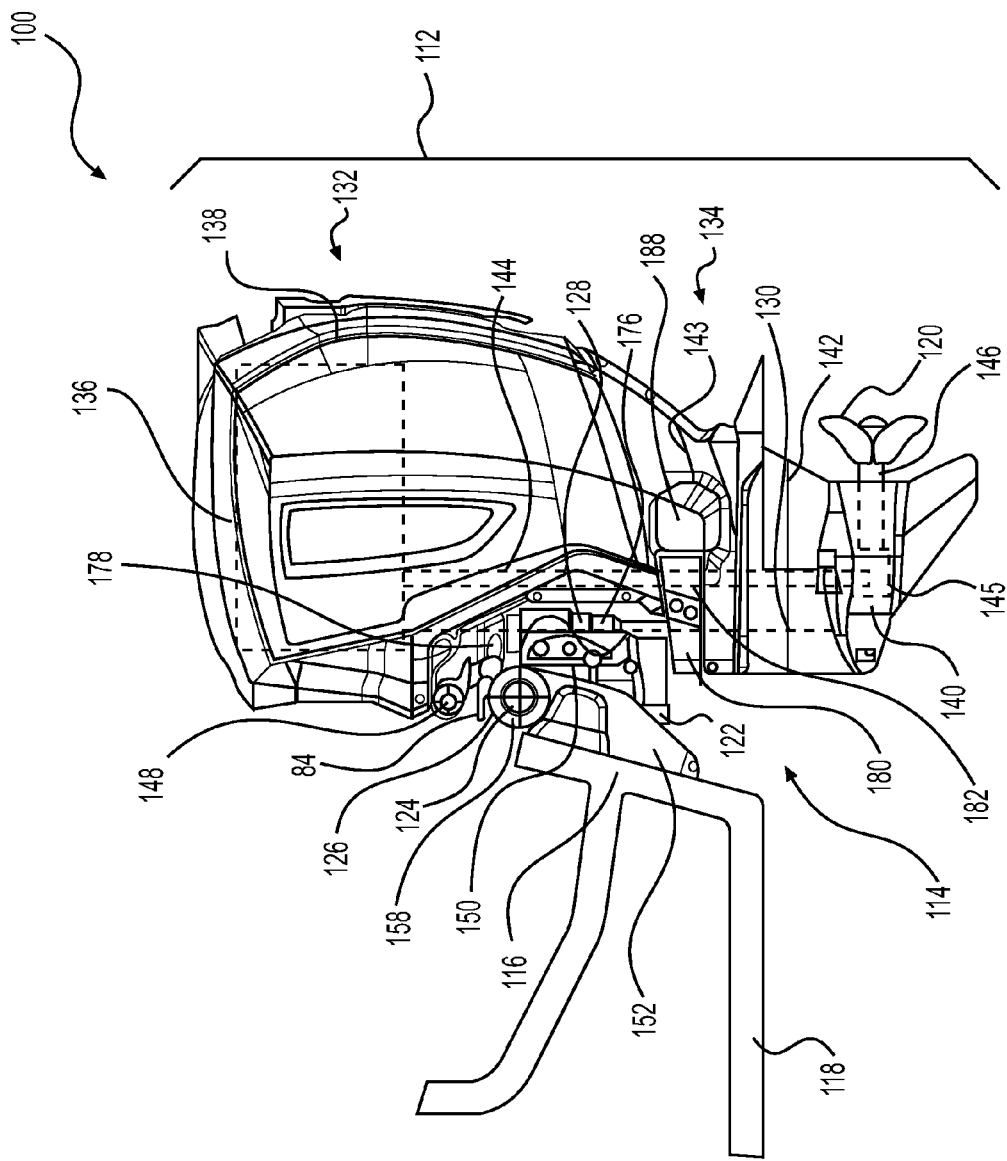
FIG. 1 is a left side elevation view of a marine outboard engine mounted to a stern of a boat.

With reference to FIG. 1, a marine outboard engine 100, shown in the upright position, includes a drive unit 112 and a bracket assembly 114. The bracket assembly 114 supports the drive unit 112 on a transom 116 of a hull 118 of an associated watercraft (not shown) such that a propeller 120 is in a submerged position with the watercraft resting relative to a surface of a body of water. The drive unit 112 can be trimmed up or down relative to the hull 118 by linear actuators 122 of the bracket assembly 114 about a tilt/trim axis 124 extending generally horizontally. The drive unit 112 can also be tilted up or down relative to the hull 118 by a rotary actuator 126 of the bracket assembly 114 about the tilt/trim axis 124. The drive unit 112 can also be steered left or right relative to the hull 118 by another rotary actuator 128 of the bracket assembly 114 about a steering axis 130. The steering axis 130 extends generally perpendicularly to the tilt/trim axis 124. When the drive unit 112 is in the upright position as shown in FIG. 1, the steering axis 130 extends generally vertically. The actuators 122, 126 and 128 are hydraulic actuators. The actuators 122, 126 and 128 and their operation will be discussed in greater detail below.

The drive unit 112 includes an upper portion 132 and a lower portion 134. The upper portion 132 includes an engine 136 (schematically shown in dotted lines) surrounded and protected by a cowling 138. The engine 136 housed within the cowling 138 is an internal combustion engine, such as a two-stroke or four-stroke engine, having cylinders extending generally horizontally when the drive unit 112 is in an upright position as shown. It is contemplated that other types of engines could be used and that the cylinders could be oriented differently. The lower portion 134 includes the gear case assembly 140, which includes the propeller 120, and the skeg portion 142. A midsection 143 is connected between the engine 136 and the gear case 140. It is contemplated that the midsection 143 could house a portion of an exhaust system of the outboard engine 100.

The engine 136 is coupled to a driveshaft 144 (schematically shown in dotted lines). When the drive unit 112 is in the upright position, the driveshaft 144 is oriented vertically. It is contemplated that the driveshaft 144 could be oriented differently relative to the engine 134. The driveshaft 144 is disposed in the cowling 138, passes through the midsection 143 and is coupled to a drive mechanism (not shown), which includes a transmission 145 and the propeller 120 mounted on a propeller shaft 146. It is contemplated that the driveshaft 144 could not pass through the midsection 143. In FIG. 1, the propeller shaft 146 is perpendicular to the driveshaft 144, however it is contemplated that it could be at other angles. The driveshaft 144 and the transmission 145 transfer the power of the engine 136 to the propeller 120 mounted on the rear side of the gear case assembly 140 of the drive unit 112. It is contemplated that the propulsion system of the outboard engine 100 could alternatively include a jet propulsion device, turbine or other known propelling device. It is further contemplated that the bladed rotor could alternatively be an impeller.

To facilitate the installation of the outboard engine 100 on the watercraft, the outboard engine 100 is provided with a connection box 148. The connection box 148 is connected on top of the rotary actuator 126. As a result, the connection box 148 pivots about the tilt/trim axis 124 when the drive unit 112 is tilted, but does not pivot about the steering axis 130 when the drive unit 112 is steered. It is contemplated that the connection box 148 could be mounted elsewhere on the bracket assembly 114 or on the drive unit 112. Devices located inside the cowling 138 which need to be connected to other devices disposed externally of the outboard engine 100, such as on the deck or hull 118 of the watercraft, are provided with lines which extend inside the connection box 148. Similarly, the corresponding devices disposed externally of the outboard engine 100 are also provided with lines that extend inside the connection box 148 where they are connected with their corresponding lines from the outboard engine 100. It is contemplated that one or more lines could be connected between one or more devices located inside the cowling 138 to one or more devices located externally of the outboard engine 100 and simply pass through the connection box 148.

Other known components of an engine assembly are included within the cowling 138, such as a starter motor, an alternator and the exhaust system. As it is believed that these components would be readily recognized by one of ordinary skill in the art, further explanation and description of these components will not be provided herein.

The bracket assembly 114 will now be described in more detail. The bracket assembly 114 includes swivel bracket 150 pivotally connected to a stern bracket 152 via the rotary actuator 126. The stern bracket 152 includes a plurality of holes and slots (not shown) adapted to receive fasteners (not shown) used to fasten the bracket assembly 114 to the transom 116 of the watercraft. By providing many holes and slots, the vertical position of the stern bracket 152, and therefore the bracket assembly 114, relative to the transom 116 can be adjusted.

The rotary actuator 126 includes a cylindrical main body 158, a central shaft (not shown) disposed inside the main body 158 and protruding from the ends thereof and a piston (not shown) surrounding the central shaft and disposed inside the main body 158. The main body 158 is located at an upper end of the swivel bracket 150 and is integrally formed therewith. It is contemplated that the main body 158 could be fastened, welded, or otherwise connected to the swivel bracket 150. The central shaft is coaxial with the tilt/trim axis 124. The stern bracket 152 and the central shaft are all rotationally fixed relative to each other.

The piston is engaged to the central shaft via oblique spline teeth on the central shaft and matching splines on the inside diameter of the piston. The piston is slidably engaged to the inside wall of the cylindrical main body 158 via longitudinal splined teeth on the outer diameter of the piston and matching splines on the inside diameter of the main body 158. By applying pressure on the piston, by supplying hydraulic fluid inside the main body 158 on one side of the piston, the piston slides along the central shaft. Since the central shaft is rotationally fixed relative to the stern bracket 152, the oblique spline teeth cause the piston, and therefore the main body 158 (due to the longitudinal spline teeth), to pivot about the central shaft and the tilt/trim axis 124. The connection between the main body 158 and the swivel bracket 150 causes the swivel bracket 150 to pivot about the tilt/trim axis 124 together with the main body 158. Supplying hydraulic fluid to one side of the piston causes the swivel bracket 150 to pivot away from the stern bracket 152 (i.e. tilt up). Supplying hydraulic fluid to the other side of the piston causes the swivel bracket 150 to pivot toward the stern bracket 152 (i.e. tilt down).

U.S. Pat. No. 7,736,206 B1, issued Jun. 15, 2010, the entirety of which is incorporated herein by reference, provides additional details regarding rotary actuators similar in construction to the rotary actuator 126. It is contemplated that the rotary actuator 126 could be replaced by a linear hydraulic actuator connected between the swivel bracket 150 and the stern bracket 152.

By supplying hydraulic fluid to the linear actuators 122, the swivel bracket 150 pivots away from the stern bracket 152 (i.e. trims up) about the tilt/trim axis 124 up to a predetermined angle. Once this angle is reached, should further pivoting of the swivel bracket 150 relative to the stern bracket 152 (i.e. tilt) be desired, the rotary actuator 126 provides the pivoting motion. To pivot the swivel bracket 150 back toward the stern bracket 152 (i.e. trim down) about the tilt/trim axis 124, the hydraulic fluid can be actively removed from the linear actuators 122 (i.e. pumped out), or can be pushed out of the linear actuators 122 due to the weight of the swivel bracket 150 and drive unit 112 pushing toward the stern bracket 152. The movement achieved by the linear actuators 122 is known as trim as they allow for precise angular adjustment of the swivel bracket 150 relative to the stern bracket 152 at a slower angular speed than that provided by the rotary actuator 126.

Similarly to the rotary actuator 126, the rotary actuator 128 includes a cylindrical main body 176, a central shaft (not shown) disposed inside the main body 176 and protruding from the ends thereof and a piston (not shown) surrounding the central shaft and disposed inside the main body 176. The main body 176 is centrally located along the swivel bracket 150 and is integrally formed therewith. It is contemplated that the main body 176 could be fastened, welded, or otherwise connected to the swivel bracket 150. The central shaft is coaxial with the steering axis 130. An upper generally U-shaped drive unit mounting bracket 178 is connected to the upper end of the central shaft. Similarly, a lower generally U-shaped drive unit mounting bracket 180 is connected to the lower end of the central shaft. The upper and lower drive unit mounting brackets 178, 180 are fastened to the drive unit 112 so as to support the drive unit 112 onto the bracket assembly 114 as will be described in greater detail below. The drive unit 112, the U-shaped drive unit mounting brackets 178, 180 and the central shaft are all rotationally fixed relative to each other.

The piston is engaged to the central shaft via oblique spline teeth on the central shaft and matching splines on the inside diameter of the piston. The piston is slidably engaged to the inside wall of the cylindrical main body 176 via longitudinal splined teeth on the outer diameter of the piston and matching splines on the inside diameter of the main body 176. By applying pressure on the piston, by supplying hydraulic fluid inside the main body 176 on one side of the piston, the piston slides along the central shaft. Since the main body 176 is rotationally fixed relative to the swivel bracket 150, the oblique spline teeth cause the central shaft and therefore the upper and lower drive unit mounting brackets 178, 180, to pivot about the steering axis 130. The connections between the drive unit 112 and the upper and lower drive unit mounting brackets 178, 180 cause the drive unit 112 to pivot about the steering axis 130 together with central shaft. Supplying hydraulic fluid to one side of the piston causes the drive unit 112 to steer left. Supplying hydraulic fluid to the other side of the piston causes the drive unit 112 to steer right.

U.S. Pat. No. 7,736,206 B1, issued Jun. 15, 2010, provides additional details regarding rotary actuators similar in construction to the rotary actuator 128. It is contemplated that the rotary actuator 128 could be replaced by a linear hydraulic actuator connected between the swivel bracket 150 and the drive unit 112.

Figure 3:
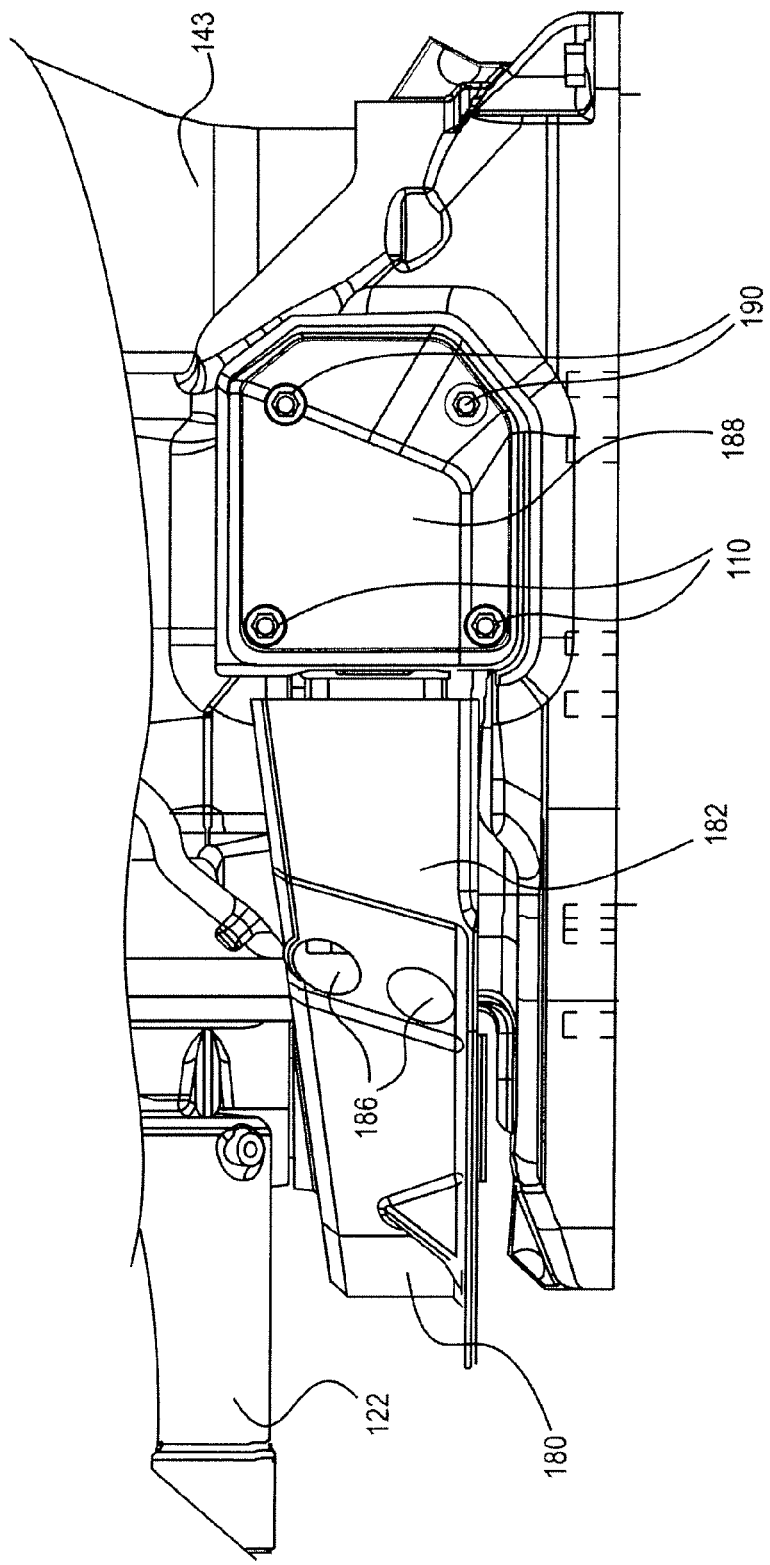
FIG. 3 is a close-up of a left side of the marine outboard engine of FIG. 1 showing a lower, left side connection between a swivel bracket and a drive unit of the marine outboard engine.

The manner in which the drive unit 112 is connected to the bracket assembly 114 will now be described in more detail with reference to FIGS. 1, 3 and 4. As previously mentioned the drive unit 112 is connected to the swivel bracket 150 via upper and lower U-shaped drive unit mounting brackets 178, 180.

Figure 4:
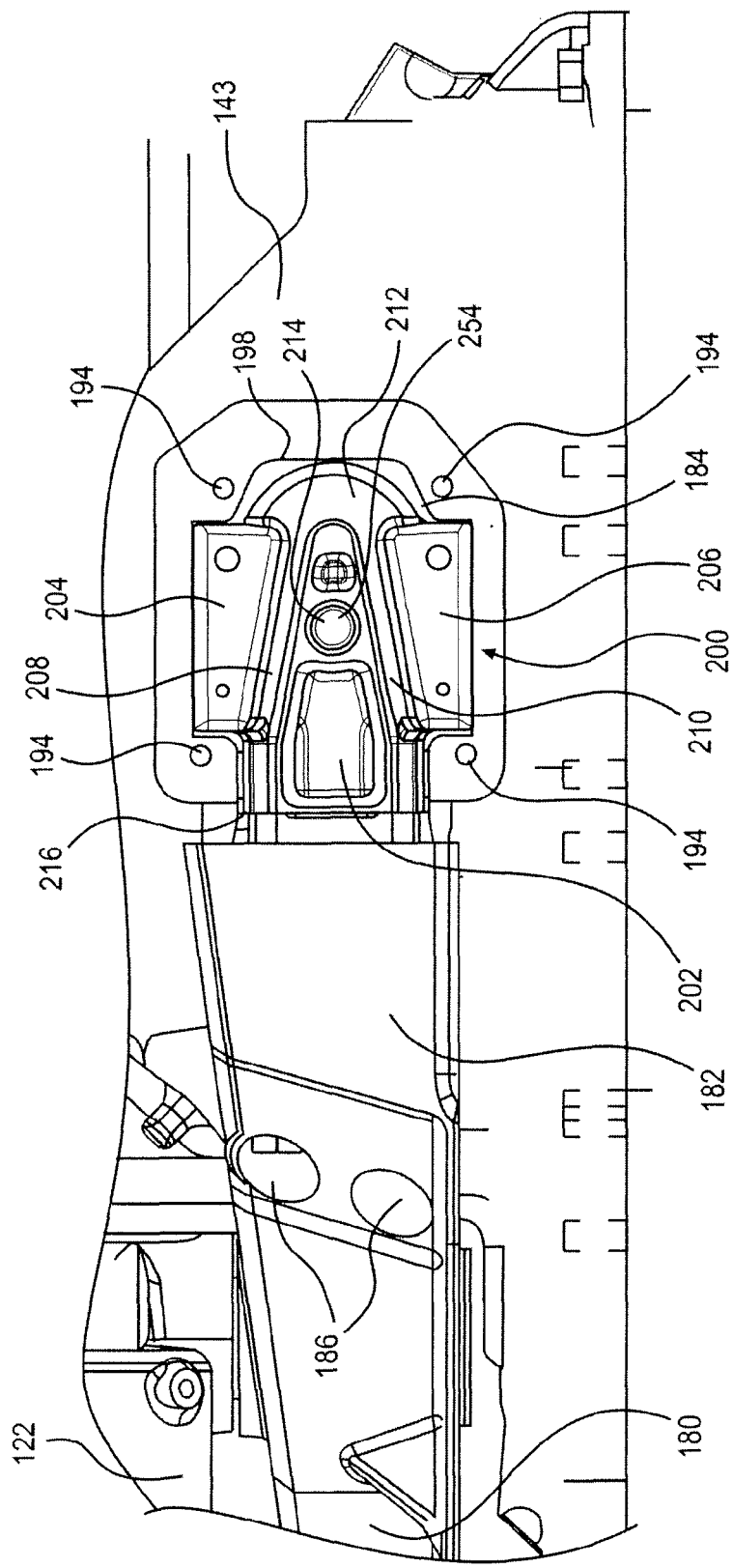
FIG. 4 is a close-up of a left side of the marine outboard engine of FIG. 1 showing the lower, left side connection between the swivel bracket and the drive unit of the marine outboard engine, with a cover for covering the drive unit mount removed.

As can be seen in FIG. 4, a left arm 182 of the lower drive unit mounting bracket 180 is connected to a left (port) side of the midsection 143 of the drive unit 112 by a drive unit mount 200. The drive unit mount 200 is press-fit into a recess 184 formed in the midsection 143. The drive unit mount 200 is connected to the left arm 182 via threaded fasteners (not shown). The threaded fasteners are inserted through aperture 186 formed in the left arm 182 in order to fasten the left arm 182 to the drive unit mount 200. It is contemplated that the drive unit mount 200 could be integrally formed in part with the midsection 143 or could be connected to the midsection 143 by fasteners or other means such as welding for example. It is contemplated that the drive unit mount 200 could alternatively be connected to the gear case 140 or to a lower portion of the cowling 138, provided that the cowling 138 is sufficiently strong to provide such a connection. It is contemplated that the drive unit mount 200 could be integrally formed in part with the arm 182 or could be connected to the arm 182 by other means such as welding for example. As can be seen in FIG. 3, a cover 188 is fastened over the drive unit mount 200 via threaded fastener 190 inserted through apertures 192 (FIG. 5) formed in the cover 188 and corresponding threaded apertures 194 (FIG. 4) formed in the midsection 143. The drive unit 200 will be described in greater detail below.

A right arm (not shown) of the lower drive unit mounting bracket 180 is connected to a right (starboard) side of the midsection 143 of the drive unit 112 by another drive unit mount 200 in the same manner as the left arm 182. A cover 188 covers the drive unit 200 as on the left side of the drive unit 112.

Right and left arms (not shown) of the upper drive unit mounting bracket 178 are connected to the right and left sides respectively of one of the engine 136, the midsection 143 and the cowling 138, provided that the cowling 138 is sufficiently strong to provide such a connection, via drive unit mounts (not shown). It is contemplated that the drive unit mounts connecting the upper drive unit mounting bracket 178 to the drive unit 112 could be the same as or similar to the drive unit mounts 200. It is also contemplated that other types of drive unit mounts could be used. For example, it is contemplated that drive unit mounts similar to the engine mounts described in United States Patent Application US2009/0001244 A1, published Jan. 1, 2009, the entirety of which is incorporated herein by reference, could be used.

The left drive unit mount 200 will now be described in detail with reference to FIGS. 6 to 12. The right drive unit mount 200 is a mirror image of the left drive unit mount 200 and as such will not be described herein.

The drive unit mount 200 has a central rigid member 202, a top rigid member 204, a bottom rigid member 206, a top resilient member 208, a lower resilient member 210, a rear resilient member 212, a pin 214 and a coating of resilient material 216. The rigid members 202, 204, 206 and the pin 214 are made of metal, such as stainless steel for example. It is contemplated that other rigid materials could be used such as plastics and composite materials. The resilient members 210, 212 and 216 and the coating 216 are made of natural rubber. It is contemplated that other resilient materials, such as other types of elastomers, could be used. The type of resilient material to be used depends at least in part on the frequencies of the vibrations that are to be absorbed by the drive unit mount 200. As will be explained below, the resilient members 210, 212 and 216 and the coating 216 are integrally formed. It is contemplated that the top and bottom rigid members 204 and 206 could also be integrally formed.

Figure 11:
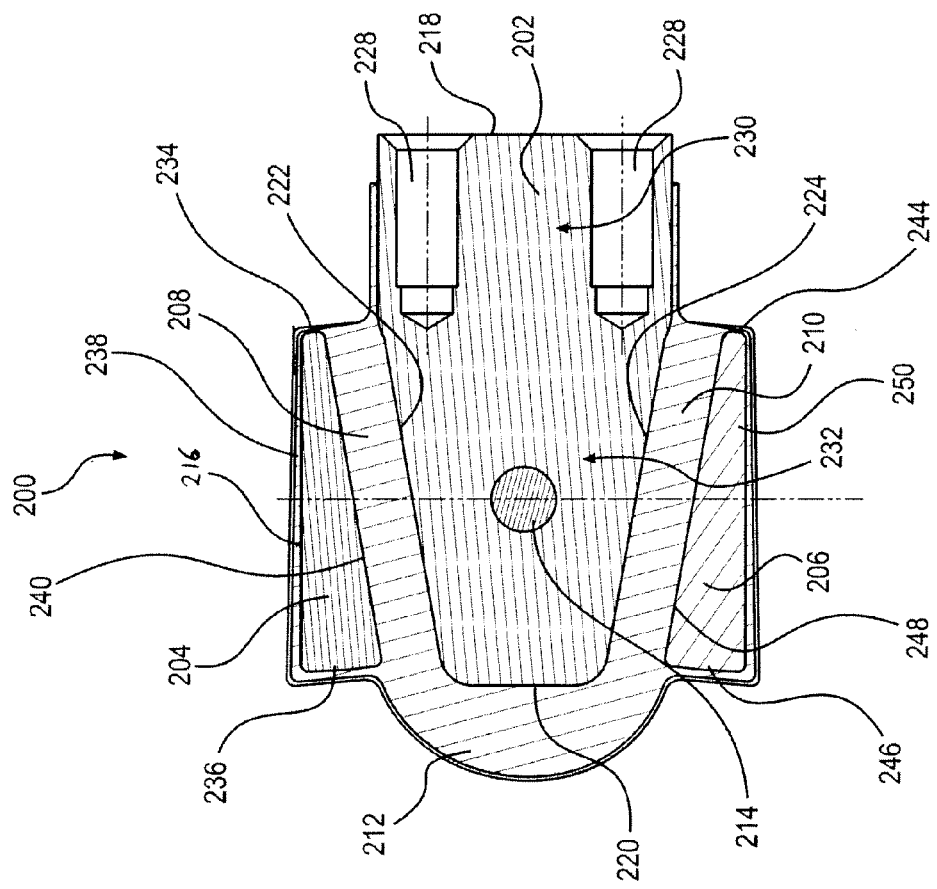
FIG. 11 is a longitudinal cross-section of the left drive unit mount of FIG. 6 taken through line 11-11 of FIG. 10.
Figure 12:
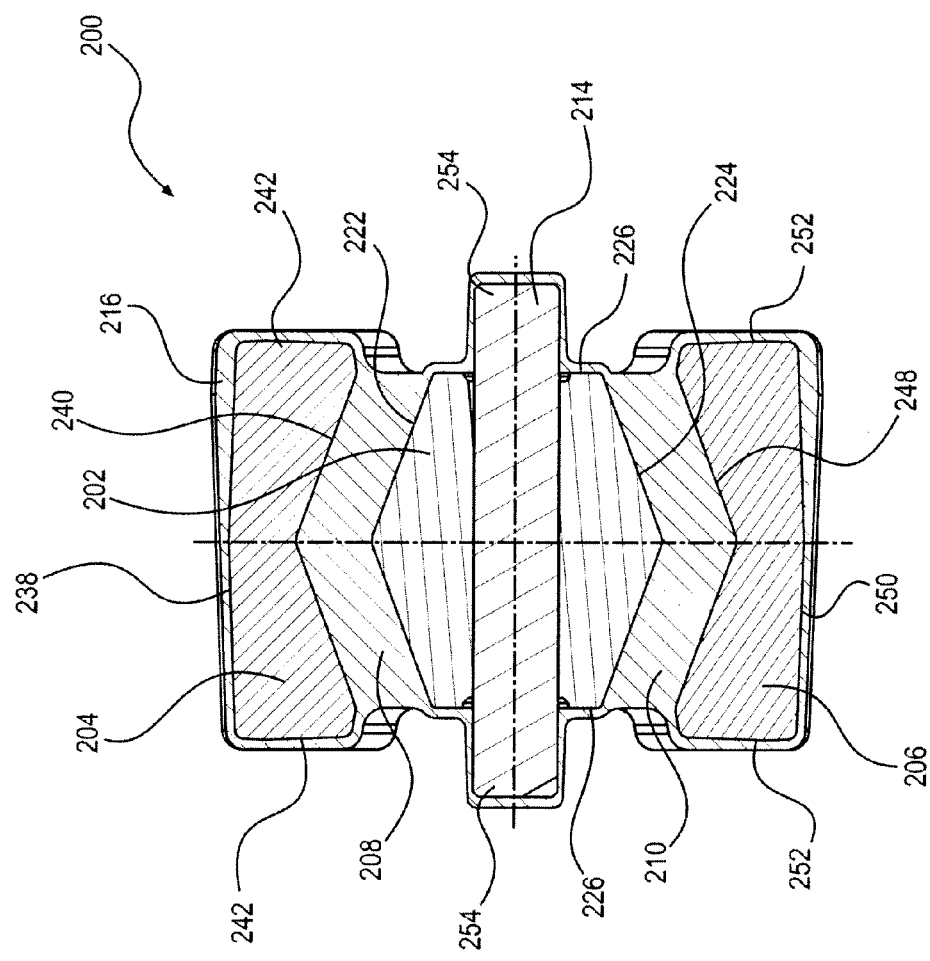
FIG. 12 is a lateral cross-section of the left drive unit mount of FIG. 6 taken through line 12-12 of FIG. 8.

The central rigid member 202 has a front 218, a back 220, a top surface 222, a bottom surface 224 and a pair of lateral sides 226. A pair of threaded apertures 228 (FIG. 7) is provided through the front 218. The apertures 228 receive the fasteners used to connect the drive unit mount 200 to the left arm 182 of the lower drive unit mounting bracket 180. As best seen in FIG. 11, the central rigid member 202 has a straight portion 230 at a front end thereof and a tapering portion 232 that tapers from the straight portion 230 to the back 220. As such, the tapering portion 232 is thicker near the front 218 than at the back 220. It is contemplated that the entire central rigid member 202 could taper from the front 218 to the back 220. As can be seen in FIG. 11, the top and bottom surfaces 222, 224 have straight linear cross-sections along the tapering portion 232. However, it is contemplated that the top and bottom surfaces 222, 224 have curved cross-sections or combinations of straight and curved cross-sections along the tapering portion 232. As best seen in FIG. 12, the top and bottom surfaces 222, 224 have convex lateral cross-sections that form generally V-shaped protrusions. As will be explained with respect to the alternative embodiments described below, it is contemplated that the top and bottom surfaces 222, 224 could have different shapes of lateral cross-sections. As a result the front 218 and back 220 are generally hexagonal in shape. As such, the central rigid member 202 is generally shaped as a right hexagonal frustum.

The top rigid member 204 is disposed above the central rigid member 202 and has a front 234, a back 236, a top surface 238, a bottom surface 240 and a pair of lateral sides 242. As best seen in FIG. 11, the bottom surface 240 is angled so as to generally follow the top surface 222 of the central rigid member 202 in a longitudinal direction. As such, the top rigid member 204 tapers from the back 236 to the front 234. As best seen in FIG. 12, the bottom surface 240 has a concave lateral cross-section that forms a generally V-shaped recess that is complementary in shape with the lateral cross-section of the top surface 222 of the central rigid member 202. It is contemplated that the angle defined by the V-shaped recess of the bottom surface 240 could be greater or smaller than the angle of the V-shaped protrusion of the top surface 222 of the central rigid member 202. As will be explained with respect to the alternative embodiments described below, it is contemplated that the bottom surface 240 could have a different shape of lateral cross-section.

The bottom rigid member 206 is disposed below the central rigid member 202 and has a front 244, a back 246, a top surface 248, a bottom surface 250 and a pair of lateral sides 252. As best seen in FIG. 11, the top surface 248 is angled so as to generally follow the bottom surface 224 of the central rigid member 202 in a longitudinal direction. As such, the bottom rigid member 206 tapers from the back 246 to the front 244. As best seen in FIG. 12, the top surface 248 has a concave lateral cross-section that forms a generally V-shaped recess that is complementary in shape with the lateral cross-section of the bottom surface 224 of the central rigid member 202. It is contemplated that the angle defined by the V-shaped recess of the top surface 248 could be greater or smaller than the angle of the V-shaped protrusion of the bottom surface 224 of the central rigid member 202. As will be explained with respect to the alternative embodiments described below, it is contemplated that the top surface 248 could have a different shape of lateral cross-section.

As best seen in FIG. 11, the bottom surface 240 of the top rigid member 204 and the top surface 248 of the bottom rigid member 206 define a space therebetween that tapers from the fronts 234, 244 of the top and bottom rigid members 204, 206 to the backs 236, 246 of the top and bottom rigid members 204, 206. The tapering portion 232 of the central rigid member 202 is received in this space. As can be seen the taper angle of the space defined between the bottom surface 240 of the top rigid member 204 and the top surface 248 of the bottom rigid member 206 and the taper angle of the tapering portion 232 of the central rigid member 202 are the same. As such, the bottom surface 240 of the top rigid member 204 is parallel to the top surface 222 of the tapering portion 232 and the top surface 248 of the bottom rigid member 206 is parallel to the bottom surface 224 of the tapering portion 232. However it is contemplated that the taper angles of the space defined between the bottom surface 240 of the top rigid member 204 and the top surface 248 of the bottom rigid member 206 and of the tapering portion 232 could be different from each other.

As best seen in FIG. 12, the pin 214 passes through the tapering portion 232 of the central rigid member 202. The portions of the pin 214 that extend from the lateral sides 226 of the central rigid member 202 form stoppers 254. The function of the stopper 254 will be explained in greater detail below. It is contemplated that the pin 214 could have a cross-section other than circular. It is also contemplated that the stoppers 254 could be formed by two pins connected to the laterals sides 226 or partially inserted inside the central rigid member 202. It is also contemplated that the stoppers 254 could be integrally formed with the lateral sides 226.

Figure 2:
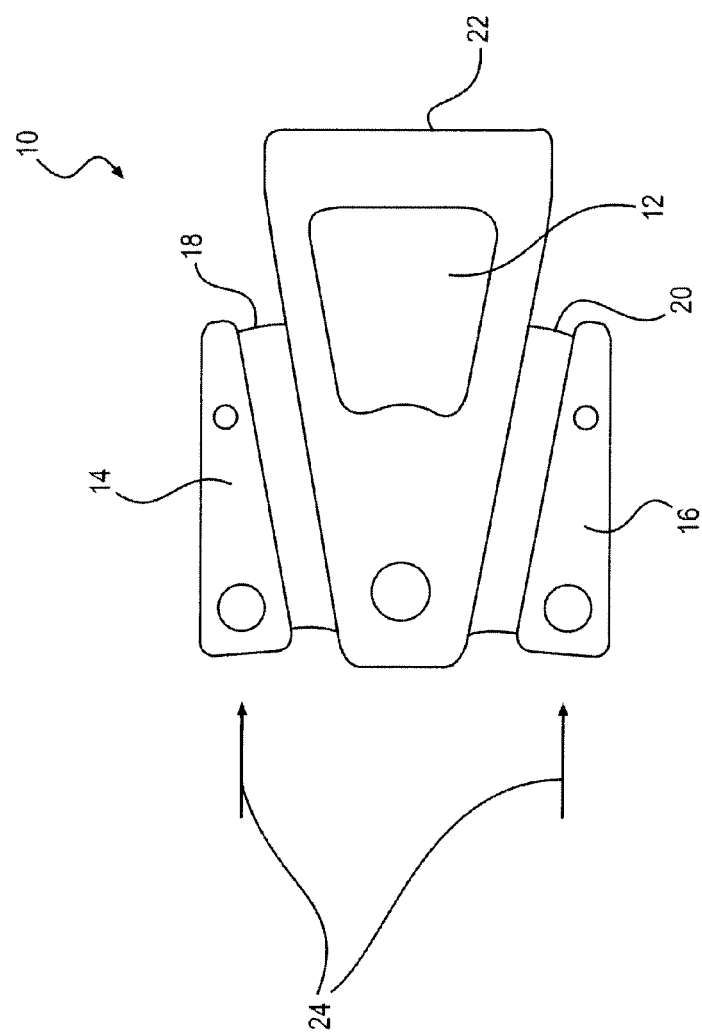
FIG. 2 is a side elevation view of a prior art drive unit mount.
Figure 8:
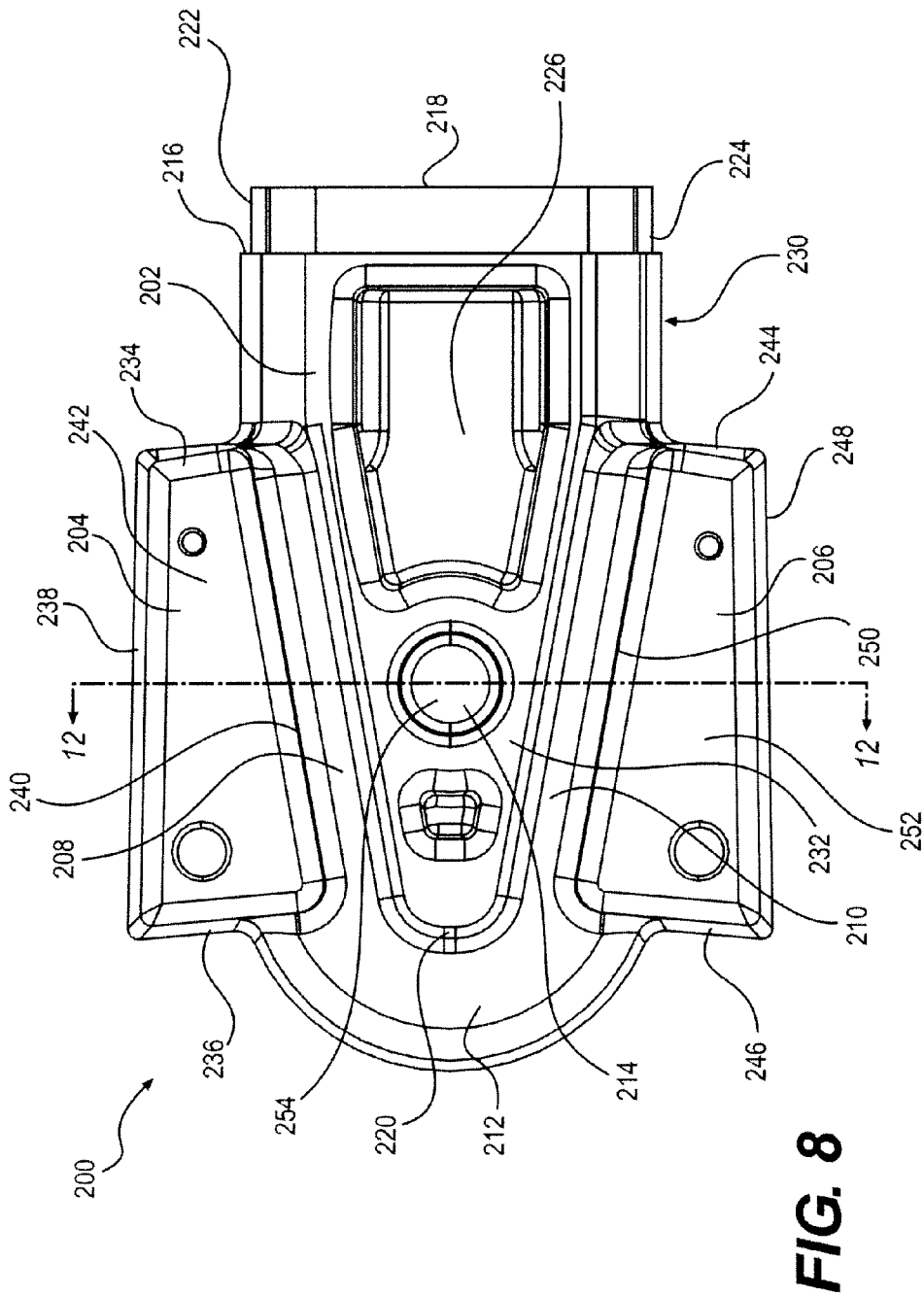
FIG. 8 is a right side elevation view of the left drive unit mount of FIG. 6.
Figure 9:
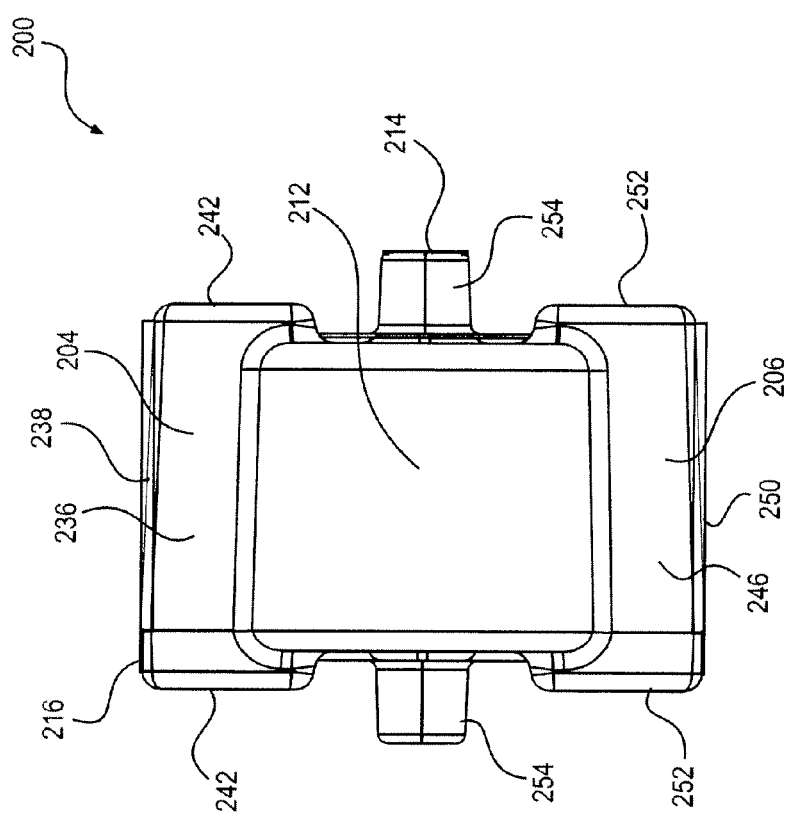
FIG. 9 is a rear elevation view of the left drive unit mount of FIG. 6.
Figure 10:
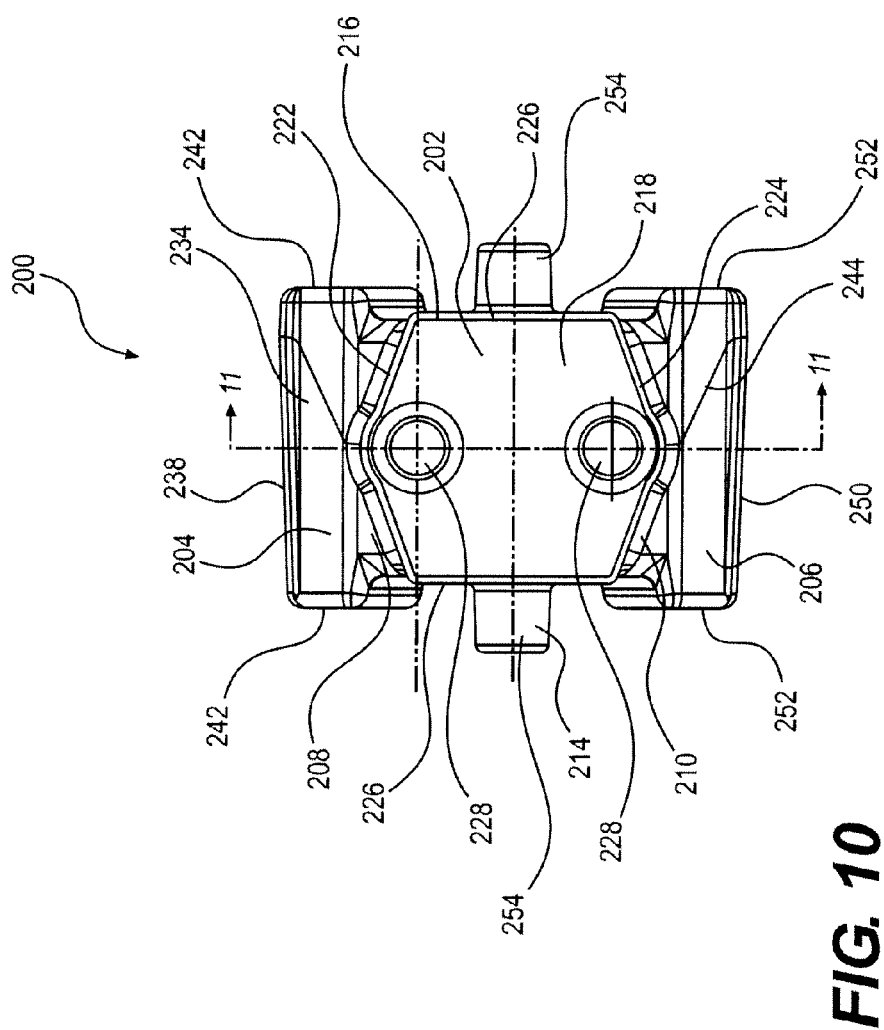
FIG. 10 is a front elevation view of the left drive unit mount of FIG. 6.

The top resilient member 208 is disposed between and is shaped so as to be in contact with the bottom surface 240 of the top rigid member 204 and the top surface 222 of the central rigid member 202. As can be seen in FIG. 12, in order to properly contact the surfaces 240, 222, the top resilient member 208 has a generally chevron-shaped lateral cross-section. Similarly, the bottom resilient member 210 is disposed between and is shaped so as to be in contact with the top surface 248 of the bottom rigid member 206 and the bottom surface 224 of the central rigid member 202. As can be seen in FIG. 12, in order to properly contact the surfaces 248, 224, the bottom resilient member 210 has a generally chevron-shaped lateral cross-section. As best seen in FIGS. 8 and 11, the rear resilient member 212 connects to the back of the top resilient member 208, wraps around the back 220 of the central rigid member 202 and connects to the back of the bottom resilient member 210. As a result, the rear resilient member 212 is disposed in part rearwardly of the back 220 of the central rigid member 202 and, as described below, acts as a kind of bumper for the drive unit mount 200. The outer surface of the rear resilient member 210 is rounded. As best seen in FIG. 11, the top, bottom and rear resilient members 208, 210, 212 together form a generally U-shape. It is contemplated that in some embodiments, the rear resilient member 212 could be omitted. It is also contemplated that the rear resilient member 212 could be provided on a drive unit mount of the type illustrated in FIG. 2 of the present application.

The top, bottom and rear resilient members 208, 210, 212 are formed by a molding process. To mold the top, bottom and rear resilient members 208, 210, 212 and make sure they have the proper shape, the central, top and bottom rigid members 202, 204, 206 and the pin 214 are disposed inside a mold in their desired position relative to each other. The rubber is then inserted inside the mold and thereby forms the top, bottom and rear resilient members 208, 210, 212. As a result, the top, bottom and rear resilient members 208, 210, 212 are integrally formed. A space is formed between the sides of the mold and the central, top and bottom rigid member 202, 204, 206 and the pin 214 such that when the rubber is inserted in the mold the coating 216 of rubber is formed which coats the outer surfaces of these elements. The coating 216 encapsulates the top and bottom rigid members 204, 206, coats the stoppers 254 formed by the pin 214 and coats the outer surfaces of the central rigid member 202 except its front end. It is contemplated that the coating 216 could be omitted. It is also contemplated that the top, bottom and rear resilient members 208, 210, 212 could be made as a single or multiple elements in one or more molds having the desired shapes of the top, bottom and rear resilient members 208, 210, 212. In such an embodiment, the molded top, bottom and rear resilient members 208, 210, 212 would then be bonded, fused or otherwise connected in their desired positions relative to the central, top and rear rigid member 202, 204, 206.

Figure 5:
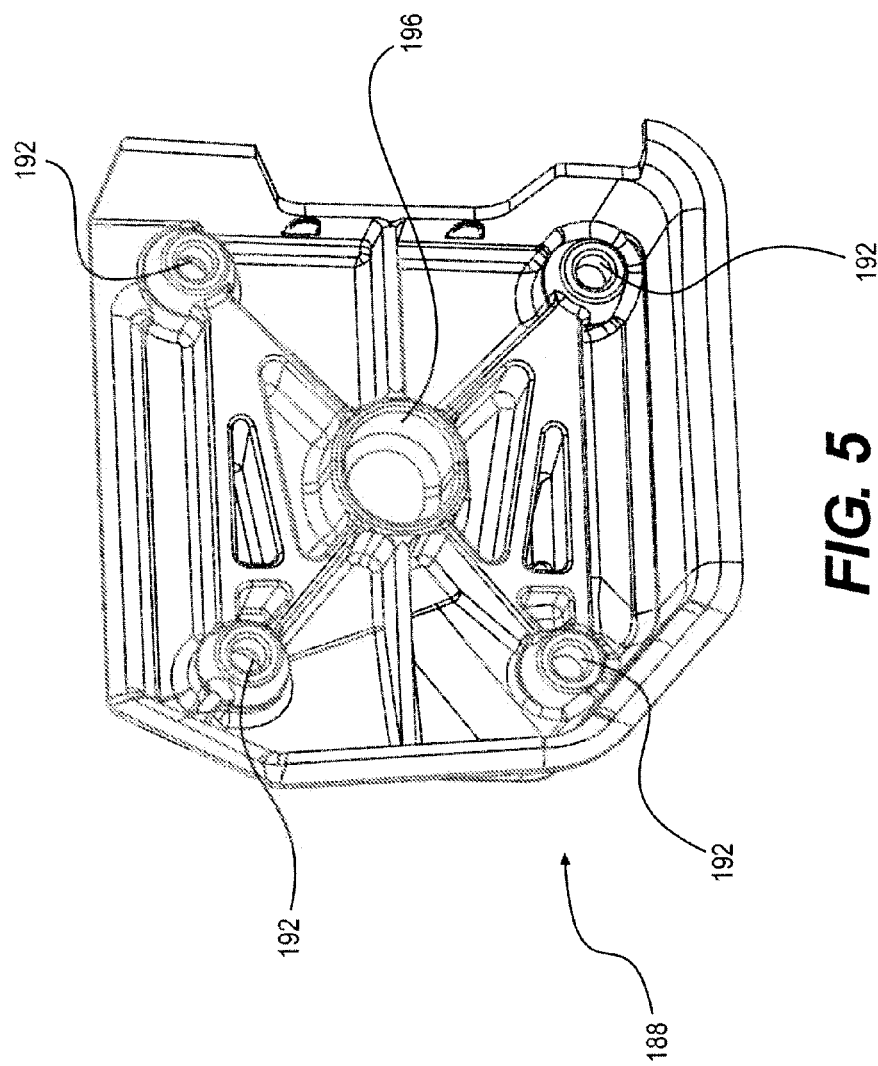
FIG. 5 is a perspective view taken from a rear, right side of the cover for covering a left drive unit mount of the marine outboard engine of FIG. 1.
Figure 6:
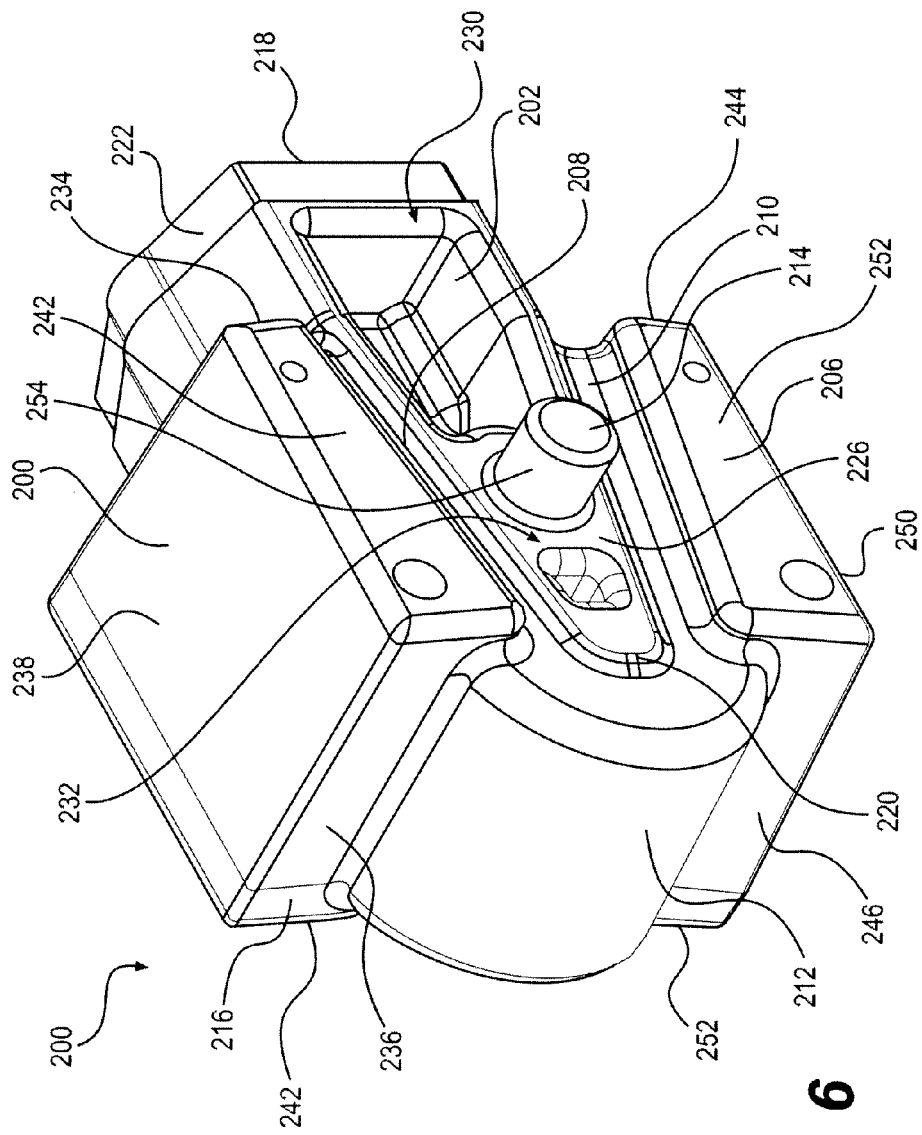
FIG. 6 is a perspective view, taken from a top, rear, right side of the left drive unit mount of the marine outboard engine of FIG. 1.
Figure 7:
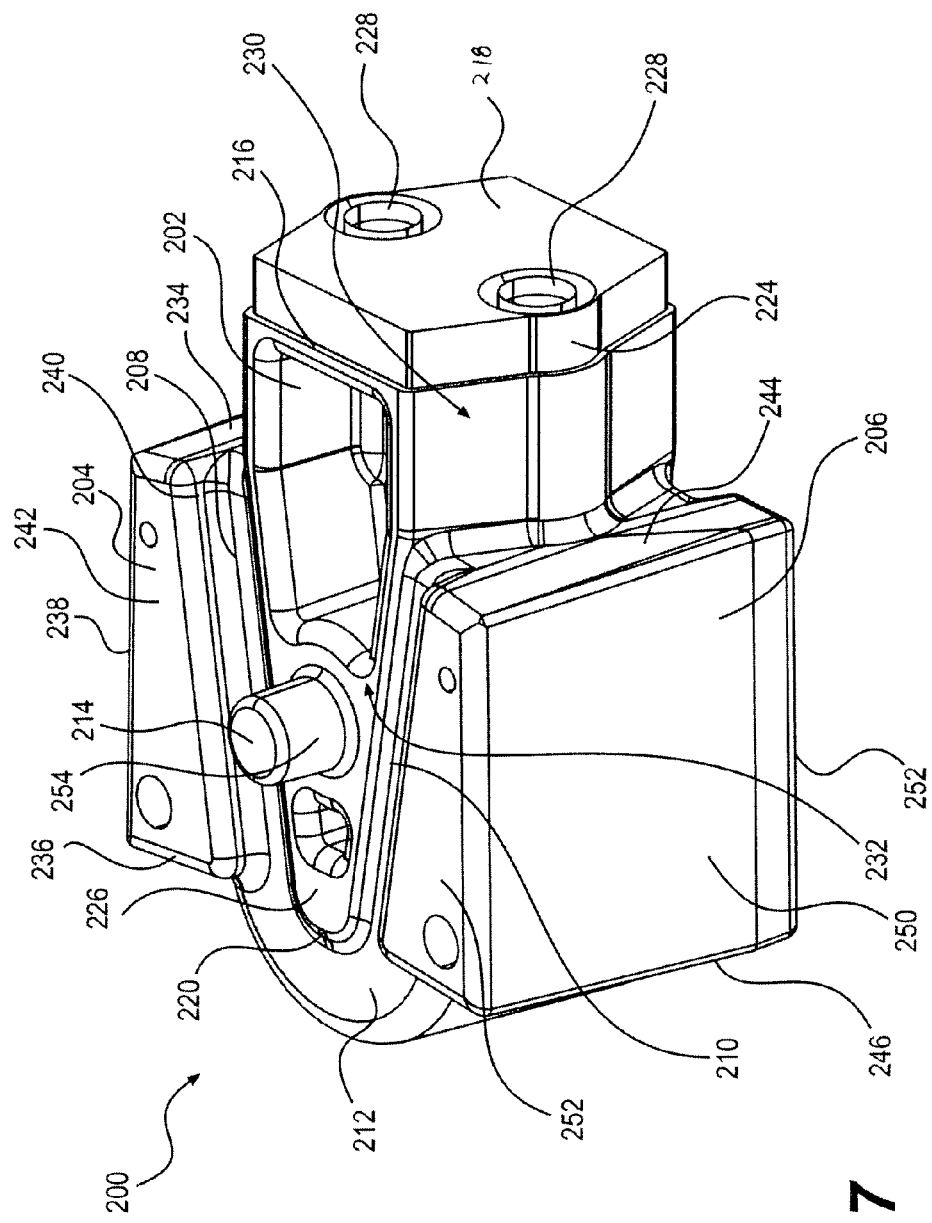
FIG. 7 is a perspective view, taken from a bottom, front, right side of the left drive unit mount of FIG. 6.

The connection of the drive unit mount 200 to the left side of the drive unit 112 will now be described in more detail with reference to FIGS. 4 and 5.

The drive unit mount 200 is press-fit inside the recess 184 formed in the midsection 143. As such, the coating 216 located on the top surface 238 of the top rigid member 204 and on the bottom surface 250 of the bottom rigid member 106 make contact with the edges of the recess 184. As can be seen in FIG. 12, in order to ensure a proper fit, the mold used to form the coating 216 is shaped such that these portions of the coating 216 form a slight taper from the left side to the right side of the drive unit mount 200 (right to left in FIG. 12) to take into account the draft angle resulting from the casting process used to form the recess 184 together with the midsection 143. It is contemplated that the top and bottom rigid members 204, 206 could be fastened to the midsection 143. It is also contemplated that the top and bottom rigid members 204, 206 could be integrally formed with the midsection 143, in which case the central rigid member 202 and the top, bottom and rear resilient members 208, 210, 212 would be fitted between the surfaces 240, 248 of the top and bottom rigid member 204, 206 to form the drive mount unit 200 on the midsection 143. It is also contemplated that the top and bottom rigid members 204, 206 could be integrally formed with the cover 188 or other parts of the drive unit 112.

The right stopper 254 is received in a slot (not shown) formed in the midsection 143. Similarly, the left stopper 254 is received in a slot 196 (FIG. 5) formed inside the cover 188.

The central rigid member 202 is fastened to the arm 182 as previously described.

When the drive unit mount 200 is installed as shown and the drive unit 112 does not generate thrust, the rear resilient member 212 is slightly spaced from a wall 198 formed by the recess rearwardly of the rear resilient member 212. It is contemplated that in an alternative embodiment, the rear resilient member 212 could be in contact with the wall 198 under these conditions. It is also contemplated that the rear resilient member 212 could also be fixed to the wall 198. It is also contemplated that the rear resilient member 212 could be separate from the rest of the drive unit mount 200 and be fixed to the wall 198 such that the front portion of the rear resilient member 212 slightly spaced from or in contact with the back 220 of the central rigid member 202.

When the drive unit 112 generates a forward thrust, the midsection 143 applies forward force to the top and bottom rigid members 204, 206. As a result, the top and bottom rigid members 204, 206 move forwardly relative to the central rigid member 202, thereby compressing the top resilient member 208 between the top rigid member 204 and the central rigid member 202 and the bottom resilient member 210 between the bottom rigid member 206 and the central rigid member 202. As the top and bottom resilient members 208, 210 are compressed, they stiffen. The higher the forward forces applied to the top and bottom rigid members 204, 206 are, the stiffer the top and bottom resilient members 208, 210 become. As the amount of forward thrust generated by the drive unit 112 increases, the space between the rear resilient member 212 and the wall 198 decreases until a predetermined thrust is reached where the rear resilient member 212 and the wall 198 come into contact. Above this predetermined thrust, the wall 198 compresses the resilient member 212, thereby further stiffening the drive unit mount 200. Since the outer surface of the rear resilient member 212 is rounded, this increase in stiffness is progressive. It should be appreciated that in embodiments where the rear resilient member 212 is in contact with the wall 198 when the drive unit 112 does not generate thrust, that any thrust generated by the drive unit 112 would cause the rear resilient member 212 to be compressed. In such embodiments, the predetermined thrust discussed above would essentially be zero thrust.

The amount of travel available to the stoppers 254 in their respective slots limits the amount of forward and rearward relative movement between the central rigid member 202 and the top and bottom rigid members 204, 206 to help prevent possible damage to the drive unit mount 200.

When the drive unit 112 is turned about the steering axis 130, the midsection 143 applies lateral forces to the top and bottom rigid members 204, 206, the direction of which depends on the direction of the turn. As a result, the top and bottom rigid members 204, 206 move laterally relative to the central rigid member 202 in the direction of the force, thereby compressing a portion of the top resilient member 208 between the top rigid member 204 and the central rigid member 202 and a portion of the bottom resilient member 210 between the bottom rigid member 206 and the central rigid member 202. As the portions of the top and bottom resilient members 208, 210 are compressed, they stiffen. The higher the lateral forces applied to the top and bottom rigid members 204, 206 are, the stiffer the portions of the top and bottom resilient members 208, 210 become. Depending on the direction of the lateral forces, different portions of the top and bottom resilient members 208, 210 are being compressed.

Figure 13:
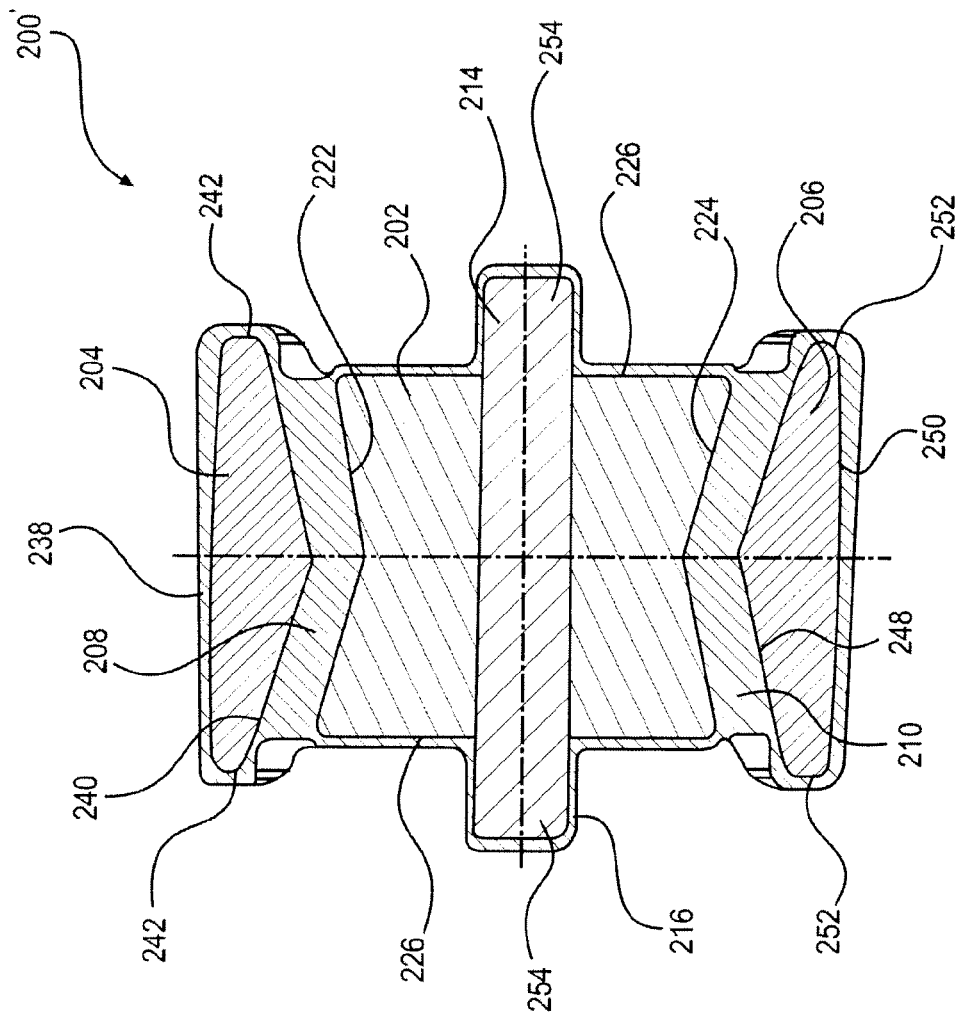
FIG. 13 is a lateral cross-section of an alternative embodiment of a left drive unit mount of the marine outboard engine of FIG. 1.
Figure 14:
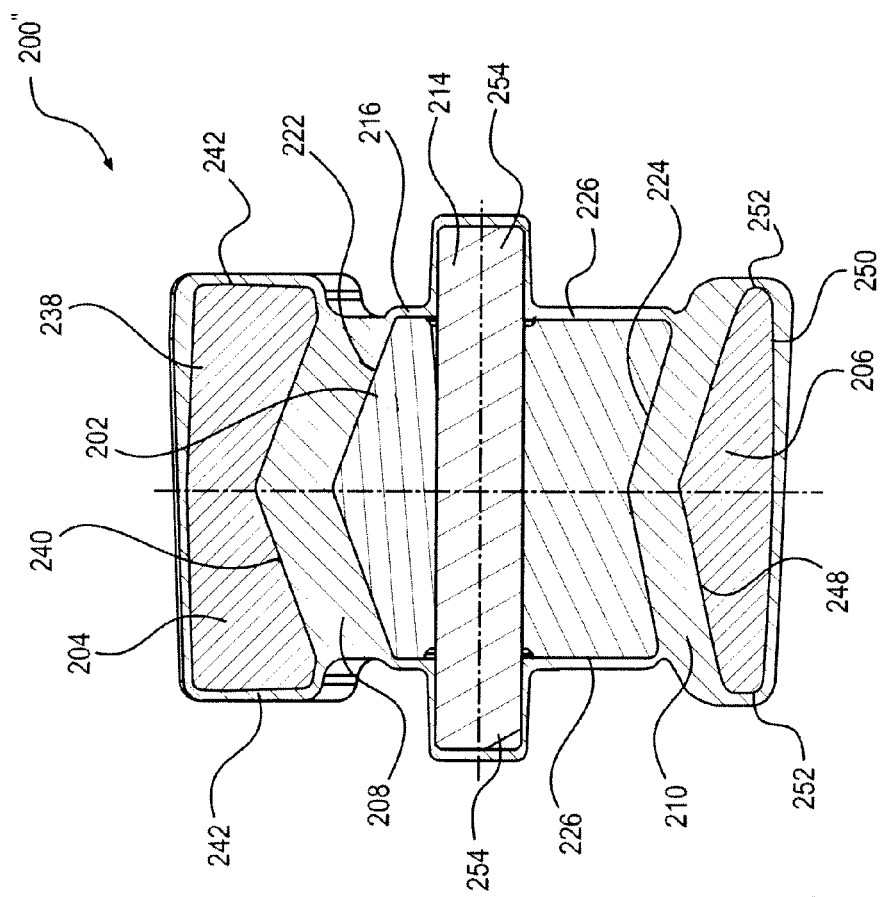
FIG. 14 is a lateral cross-section of another alternative embodiment of a left drive unit mount of the marine outboard engine of FIG. 1.
Figure 15:
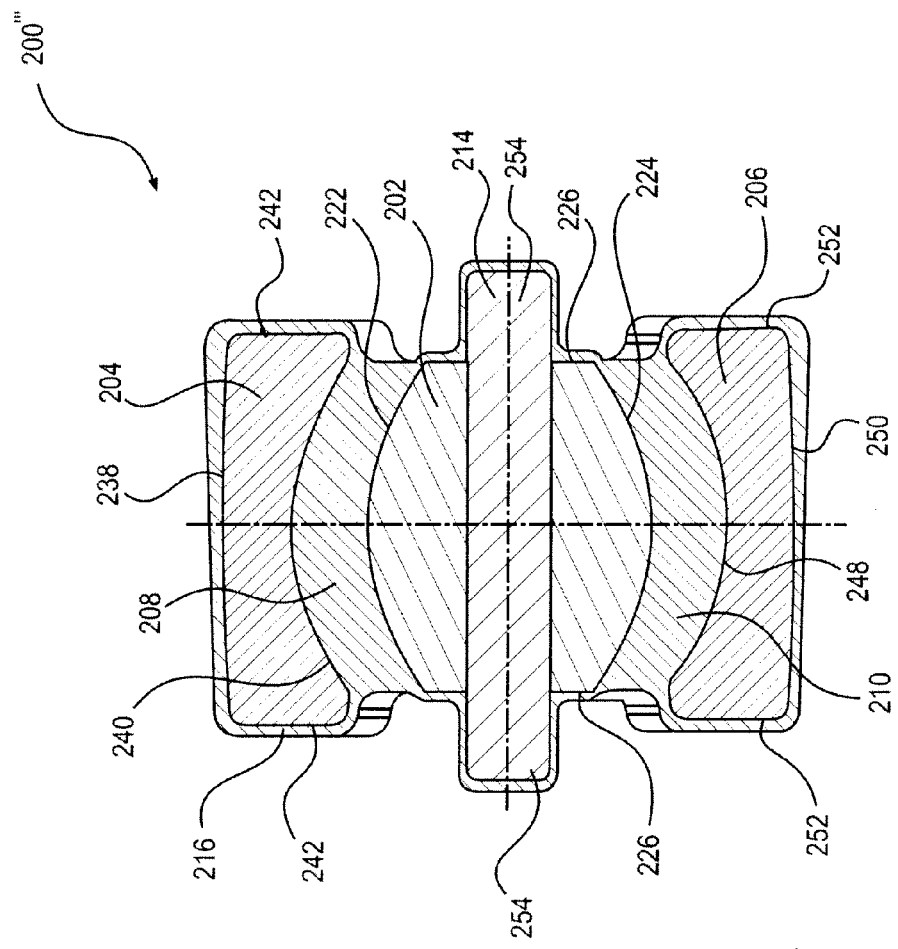
FIG. 15 is a lateral cross-section of yet another alternative embodiment of a left drive unit mount of the marine outboard engine of FIG. 1.

Turning now to FIGS. 13 to 15, three alternative embodiments of the drive unit mount 200 will be described. These are drive unit mounts 200', 200" and 200'". The drive unit mounts 200', 200" and 200'" have the same components as the drive unit 200. As such these components have been labeled with the same reference numerals in FIGS. 13 to 15 as those used for the drive unit mount 200. The longitudinal cross-sections of the drive unit mounts 200', 200" and 200'" are similar to the cross-section of the drive unit mount 200 shown in FIG. 11. The main difference between the drive unit mounts 200', 200" and 200'" and the drive unit mount 200 resides in the shapes of the lateral cross-sections of the surfaces 222, 224, 240 and 248. As such, and for simplicity, only these shapes will be described below and the other features of the drive unit mounts 200', 200" and 200'" will not be described in detail. The drive unit mounts 200', 200" and 200'" react similarly to the drive unit mount 200 to the application of forward and lateral thrusts, and as such, this will also not be described below. Although this will not be described specifically below, it should be understood that the shapes of the top and bottom resilient mounts 208, 210 in the drive unit mounts 200', 200" and 200'" are also modified with respect to those of the top and bottom resilient mounts 208, 210 in the drive unit mounts 200 in order to properly fit between the central rigid member 202 and the top and bottom rigid members 204, 206.

FIG. 13 shows a lateral cross-section of the drive unit mount 200'. The top and bottom surfaces 222, 224 of the central rigid member have concave lateral cross-sections that form generally V-shaped recesses. The bottom surface 240 of the top rigid member 204 has a convex lateral cross-section that forms a generally V-shaped protrusion that is complementary in shape with the lateral cross-section of the top surface 222 of the central rigid member 202. It is contemplated that the angle defined by the V-shaped protrusion of the bottom surface 240 of the top rigid member 204 could be greater or smaller than the angle of the V-shaped recess of the top surface 222 of the central rigid member 202. Similarly, the top surface 248 of the bottom rigid member 206 has a convex lateral cross-section that forms a generally V-shaped protrusion that is complementary in shape with the lateral cross-section of the bottom surface 224 of the central rigid member 202. It is contemplated that the angle defined by the V-shaped protrusion of the top surface 248 of the bottom rigid member 206 could be greater or smaller than the angle of the V-shaped recess of the bottom surface 224 of the central rigid member 202.

FIG. 14 shows a lateral cross-section of the drive unit mount 200". In the drive unit mount 200", the lateral cross-sections of the top surface 222 of the central rigid member 202 and of the bottom surface 240 of the top rigid member 204 are similar to the corresponding surfaces of the drive unit mount 200, and the lateral cross-sections of the bottom surface 224 of the central rigid member 202 and of the top surface 248 of the bottom rigid member 206 are similar to the corresponding surfaces of the drive unit mount 200' shown in FIG. 13. It is contemplated that other alternative embodiments of engine mounts could combine the lateral cross-section shapes of the surfaces 222, 240 of any of the embodiments described herein with the lateral cross-section shapes of the surfaces 224, 248 of any other of the embodiments described herein.

FIG. 15 shows a lateral cross-section of the drive unit mount 200'". The top and bottom surfaces 222, 224 of the central rigid member have concave lateral cross-sections that form generally arc-shaped protrusions. The bottom surface 240 of the top rigid member 204 has a concave lateral cross-section that forms a generally arc-shaped recess that is complementary in shape with the lateral cross-section of the top surface 222 of the central rigid member 202. It is contemplated that the radius of curvature of the arc-shaped recess of the bottom surface 240 of the top rigid member 204 could be greater or smaller than the radius of curvature of the arc-shaped protrusion of the top surface 222 of the central rigid member 202. Similarly, the top surface 248 of the bottom rigid member 206 has a concave lateral cross-section that forms a generally arc-shaped recess that is complementary in shape with the lateral cross-section of the bottom surface 224 of the central rigid member 202. It is contemplated that the radius of curvature of the arc-shaped recess of the top surface 248 of the bottom rigid member 206 could be greater or smaller than the radius of curvature of the arc-shaped protrusion of the bottom surface 224 of the central rigid member 202. It is contemplated that the lateral cross-sections of the surfaces 222, 224 could be concave to form generally arc-shaped recesses and the lateral cross-sections of the surfaces 240, 248 could be convex to form generally arc-shaped protrusions.

It is contemplated that the drive unit mounts 200, 200', 200" and 200'" could be mounted between the mounting bracket 180 and the drive unit 112 in an orientation opposite to the one illustrated in FIG. 4 (i.e. such that the fronts 218, 234, 244 of the rigid members 202, 204, 206 now face toward the rear of the drive unit 112). In such embodiments, the front 218 of the central rigid member 202 (now located at the rear thereof) is connected to the drive unit 112 (to the front wall 198 for example) and the top and bottom rigid members 204, 206 are connect to the left arm 182.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A drive unit mount comprising:
    a central rigid member having a front, a back, a top surface and a bottom surface,
        the central rigid member tapering at least in part from the front to the back,
        the top surface of the central rigid member having one of a convex and a concave lateral cross-section,
        the bottom surface of the central rigid member having one of a convex and a concave lateral cross-section;
    a top rigid member having a front, a back and a bottom surface,
        the top rigid member being disposed above the central rigid member,
        the bottom surface of the top rigid member having a concave lateral cross-section when the top surface of the central rigid member has a convex lateral cross-section and having a convex lateral cross-section when the top surface of the central rigid member has a concave lateral cross-section;
    a bottom rigid member having a front, a back and a top surface,
        the bottom rigid member being disposed below the central rigid member,
        the top surface of the bottom rigid member having a concave lateral cross-section when the bottom surface of the central rigid member has a convex lateral cross-section and having a convex lateral cross-section when the bottom surface of the central rigid member has a concave lateral cross-section,
    a space defined between the bottom surface of the top rigid member and a top surface of the bottom rigid member tapering at least in part from the fronts of the top and bottom rigid members to the backs of the top and bottom rigid members,
    at least a portion of the central rigid member being received in the space;

a top resilient member disposed between and being in contact with the bottom surface of the top rigid member and the top surface of the central rigid member; and a bottom resilient member disposed between and being in contact with the top surface of the bottom rigid member and the bottom surface of the central rigid member.

2. The drive unit mount of claim 1, wherein the top and bottom surfaces of the central rigid member have convex lateral cross-sections; and wherein the bottom surface of the top rigid member and the top surface of the bottom rigid member have concave lateral cross-sections.

3. The drive unit mount of claim 2, wherein the convex lateral cross-sections of the top and bottom surfaces of the central rigid member each include a generally V-shaped protrusion;

wherein the concave lateral cross-sections of the bottom surface of the top rigid member and the top surface of the bottom rigid member each include a generally V-shaped recess; and wherein the top and bottom resilient members have generally chevron-shaped lateral cross-sections.

4. The drive unit mount of claim 3, wherein the central rigid member is generally shaped as a right hexagonal pyramidal frustum; and wherein the front and back of the central rigid member are generally hexagonal in shape.

5. The drive unit mount of claim 1, wherein the lateral cross-section of the top surface of the central rigid member is complementary in shape to the lateral cross-section of the bottom surface of the top rigid member; and wherein the lateral cross-section of the bottom surface of the central rigid member is complementary in shape to the lateral cross-section of the top surface of the bottom rigid member.

6. The drive unit mount of claim 1, further comprising a rear resilient member disposed at least in part rearwardly of and being in contact with the back of the central rigid member.

7. The drive unit mount of claim 6, wherein the rear resilient member is integrally formed with the top and bottom resilient members.

8. The drive unit mount of claim 1, further comprising a stopper extending from at least one lateral side of the central rigid member.

9. The drive unit mount of claim 1, further comprising a coating of resilient material coating at least in part the central rigid member, the top rigid member and the bottom rigid member;

wherein the coating, the top resilient member and the bottom resilient member are made of a same resilient material and are integrally formed.

10. A marine outboard engine for a watercraft comprising:
a stern bracket for mounting the marine outboard engine to the watercraft;
a swivel bracket pivotally connected to the stern bracket about a generally horizontal tilt/trim axis;
a drive unit pivotally connected to the swivel bracket about a steering axis, the steering axis being generally perpendicular to the tilt/trim axis;
a first drive unit mount connecting a first side of the drive unit to the swivel bracket; and
a second drive unit mount connecting a second side of the drive unit to the swivel bracket, the second side of the swivel bracket being opposite to the first side of the swivel bracket, each of the first and second drive unit mounts comprising:
a central rigid member having a front, a back, a top surface and a bottom surface,
the central rigid member tapering at least in part from the front to back,
the top surface of the central rigid member having one of a convex and a concave lateral cross-section,
the bottom surface of the central rigid member having one of a convex and a concave lateral cross-section,
the central rigid member being connected to the swivel bracket;
a top rigid member having a front, a back and a bottom surface,
the top rigid member being disposed above the central rigid member,
the bottom surface of the top rigid member having a concave lateral cross-section when the top surface of the central rigid member has a convex lateral cross-section and having a convex lateral cross-section when the top surface of the central rigid member has a concave lateral cross-section,
the top rigid member being connected to the drive unit;
a bottom rigid member having a front, a back and a top surface,
the bottom rigid member being disposed below the central rigid member,
the top surface of the bottom rigid member having a concave lateral cross-section when the bottom surface of the central rigid member has a convex lateral cross-section and having a convex lateral cross-section when the bottom surface of the central rigid member has a concave lateral cross-section,
a space defined between the bottom surface of the top rigid member and a top surface of the bottom rigid member tapering at least in part from the fronts of the top and bottom rigid members to the backs of the top and bottom rigid members,
at least a portion of the central rigid member being received in the space,
the bottom rigid member being connected to the drive unit;
a top resilient member disposed between and being in contact with the bottom surface of the top rigid member and the top surface of the central rigid member; and
a bottom resilient member disposed between and being in contact with the top surface of the bottom rigid member and the bottom surface of the central rigid member.

11. The marine outboard engine of claim 10, wherein the drive unit comprises:
a cowling;
an engine disposed in the cowling;
a driveshaft disposed in the cowling, the driveshaft having a first end and a second end, the first end of the driveshaft being operatively connected to the engine;
a midsection having a first end and a second end, the first end of the midsection being connected to the engine;
a gear case operatively connected to the second end of the midsection;
a transmission disposed in the gear case, the transmission being operatively connected to the second end of the driveshaft;

a propeller shaft disposed at least in part in the gear case at an angle to the driveshaft, the propeller shaft being operatively connected to the transmission; and a bladed rotor connected to the propeller shaft;

wherein the first and second drive unit mounts are connected to one of the engine, the cowling, the midsection and the gear case.

12. The marine outboard engine of claim 11, wherein the one of the engine, the cowling, the midsection and the gear case is the midsection.

13. The marine outboard engine of claim 10, wherein for each of the first and second drive unit mounts, the top and bottom rigid members are connected to the drive unit by being press-fit in the drive unit.

14. The marine outboard engine of claim 10, wherein for each of the first and second drive unit mounts:

the top and bottom surfaces of the central rigid member have convex lateral cross-sections; and the bottom surface of the top rigid member and the top surface of the bottom rigid member have concave lateral cross-sections.

15. The marine outboard engine of claim 10, wherein each of the first and second drive unit mounts further comprises a stopper extending from at least one lateral side of the central rigid member, the stopper being received in a corresponding slot formed in the drive unit.

16. The marine outboard engine of claim 15, wherein the drive unit comprises a first cover covering at least in part the first drive unit mount and a second cover covering at least in part the second drive unit mount;

wherein the slot receiving the stopper of the first drive unit mount is formed in the first cover; and wherein the slot receiving the stopper of the second drive unit mount is formed in the second cover.

* * * * *